United States Patent
De Buitléir

(10) Patent No.: US 11,082,292 B2
(45) Date of Patent: Aug. 3, 2021

(54) METHOD AND APPARATUS FOR DYNAMIC NETWORK CONFIGURATION AND OPTIMISATION USING ARTIFICIAL LIFE

(71) Applicant: Telefonaktiebolaget LM Ericsson (publ), Stockholm (SE)

(72) Inventor: Amy De Buitléir, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/954,930

(22) PCT Filed: Dec. 21, 2017

(86) PCT No.: PCT/EP2017/084096
§ 371 (c)(1),
(2) Date: Jun. 17, 2020

(87) PCT Pub. No.: WO2019/120543
PCT Pub. Date: Jun. 27, 2019

(65) Prior Publication Data
US 2020/0336373 A1    Oct. 22, 2020

(51) Int. Cl.
*H04L 12/24* (2006.01)
*G06N 20/00* (2019.01)
(Continued)

(52) U.S. Cl.
CPC ......... *H04L 41/0813* (2013.01); *G06N 5/045* (2013.01); *G06N 20/00* (2019.01); *H04L 43/04* (2013.01)

(58) Field of Classification Search
CPC ..... H04L 41/0813; H04L 43/04; H04L 43/08; H04L 41/0883; H04L 41/16;
(Continued)

(56) References Cited

U.S. PATENT DOCUMENTS

2012/0256786 A1* 10/2012 Bowring ............... G01S 7/026
                                                        342/188
2016/0026922 A1*  1/2016 Vasseur ................ G06N 5/048
                                                        706/12
(Continued)

FOREIGN PATENT DOCUMENTS

JP      2012198839 A   * 10/2012
WO     2016014470 A1     1/2016
(Continued)

OTHER PUBLICATIONS

An Architecture for Pattern Recognition and Decision-Making by Amy de Buitleir et al.; Faculty of Engineering and Informatics, Athlone Institute of Technology, Athlone, Ireland—Aug. 2016.
(Continued)

*Primary Examiner* — Soe Hlaing
(74) *Attorney, Agent, or Firm* — Baker Botts, LLP

(57) ABSTRACT

A method for recommending configuration changes in a communications network. The method comprises maintaining (102) a plurality of machine-learning processes, wherein an individual machine-learning process operates based on a data model and decision-making rules, and the plurality of machine-learning processes operate based on a plurality of different data models and a plurality of different decision-making rules. The method also comprises obtaining (104) values of Key Performance Indicators, KPIs, from network elements of the communications network and obtaining a goal (106) defining at least one KPI value characterising wanted operation of the communications network. The method also comprises producing (108) by the plurality of machine-learning processes, based on the received values of KPIs and using the data models and decision-making rules, a plurality of individual recommendations; and producing an output recommendation (110) based on the produced individual recommendations. An apparatus realising the above method is also disclosed.

18 Claims, 6 Drawing Sheets

(51) Int. Cl.
*G06N 5/04* (2006.01)
*H04L 12/26* (2006.01)

(58) Field of Classification Search
CPC . H04L 41/0823; H04L 41/5019; G06N 20/00; G06N 5/045
See application file for complete search history.

(56) References Cited

U.S. PATENT DOCUMENTS

2017/0178245 A1   1/2017   Rodkey
2019/0102695 A1*  4/2019   Biswas ................ G06F 13/102

FOREIGN PATENT DOCUMENTS

WO   2016026509 A1   2/2016
WO   2016032531 A1   3/2016

OTHER PUBLICATIONS

PCT Notification of Transmittal of the International Search Report and the Written Opinion of the International Searching Authority, or the Declaration issued for International application No. PCT/EP2017/084096—dated Jan. 4, 2019.
Wains: A Pattern-Seeking Artificial Life Species by Amy de Buitleir et al., Athlone Institute of Technology; Artificial Life 18:399-423, 2012 Massachusetts Institute of Technology—2012.

* cited by examiner

METHOD AND APPARATUS FOR DYNAMIC NETWORK CONFIGURATION AND OPTIMISATION USING ARTIFICIAL LIFE

PRIORITY

This nonprovisional application is a U.S. National Stage Filing under 35 U.S.C. § 371 of International Patent Application Serial No. PCT/EP2017/084096 filed Dec. 21, 2017 and entitled "A METHOD AND APPARATUS FOR DYNAMIC NETWORK CONFIGURATION AND OPTIMISATION USING ARTIFICIAL LIFE" which is hereby incorporated by reference in its entirety.

TECHNICAL FIELD

The present invention relates to communications networks, in general, and in particular to dynamic network configuration and optimisation by data mining using artificial life species.

BACKGROUND

Communications network operators and Network Operation Centers continuously collect and monitor performance data and key performance indicators (KPIs) for the network elements (NEs) in order to measure the performance and reliability of the managed network. KPIs give the operators quantifiable metrics that help them to optimise the network Quality of Service (QoS) and satisfy Service Level Agreements (SLAs). Operators define alarms that are triggered when predetermined thresholds of specific KPIs are breached. When the alarm is triggered, the operators take appropriate actions to deal with the issue that caused the trouble condition. However, configuring alarms is problematic. If the alarm is too sensitive, it can trigger in response to conditions that are self-correcting, making it less useful. If the alarm is not sensitive enough, the underlying condition may be well underway before the operators are notified, causing a delay in correcting the problem.

Objects in a Self-Organizing Network (SON) can configure or reconfigure themselves as needed in order to achieve optimal performance. SON performs three main functions.
 a) Self-configuration, whereby newly deployed objects (e.g. network elements such as eNodeBs) can configure their identity, transmission frequency and power, leading to faster cell planning and rollout.
 b) Self-optimisation, which includes optimisation of coverage, capacity, handover and interference.
 c) Self-healing, which reduces the impact of inoperative nodes by adjusting parameters and algorithms in adjacent cells to support the users that were supported by the failing node.

At present, only a limited number of SON functions have been implemented. These include Automatic Neighbour Relations (ANR), Physical Layer Cell Identity (PCI) Conflict Detection, and detection of sleeping cells. More SON features are planned. Historically, each new solution is designed and implemented separately. These solutions use complex algorithms and may require the operator to fine-tune configuration parameters.

SUMMARY

It is the object of the present invention to provide an improved method and apparatus for recommending configuration changes in a communications network.

According to a first aspect of the present invention there is provided a method for recommending configuration changes in a communications network. The method comprises maintaining a plurality of machine-learning processes, wherein an individual machine-learning process operates based on a data model and decision-making rules. The plurality of machine-learning processes operate based on a plurality of different data models and a plurality of different decision-making rules. The method also comprises obtaining values of Key Performance Indicators, KPIs, from network elements of the communications network and obtaining a goal defining at least one KPI value characterising wanted operation of the communications network. Further, the method comprises producing by the plurality of machine-learning processes, based on the received values of KPIs and using the data models and decision-making rules, a plurality of individual recommendations, wherein an individual recommendation gives value of at least one parameter, which needs to be configured to achieve the goal. The method also comprises producing an output recommendation based on the produced individual recommendations.

According to a second aspect of the present invention there is provided an apparatus for recommending configuration changes in a communications network. The apparatus comprises a processing circuitry and a memory. The memory contains instructions executable by the processing circuitry such that the apparatus is operative to maintain a plurality of machine-learning processes, wherein an individual machine-learning process operates based on a data model and decision-making rules. The plurality of machine-learning processes operate based on a plurality of different data models and a plurality of different decision-making rules. The apparatus is also operative to obtain values of Key Performance Indicators, KPIs, from network elements of the communications network and to obtain a goal defining at least one KPI value characterising wanted operation of the communications network. The apparatus is also operative to produce by the plurality of machine-learning processes, based on the received values of KPIs and using the data models and decision-making rules, a plurality of individual recommendations. An individual recommendation gives value of at least one parameter, which needs to be configured to achieve the goal. The apparatus is also operative to produce an output recommendation based on the produced individual recommendations.

According to a third aspect of the present invention there is provided an apparatus for recommending configuration changes in a communications network. The apparatus is adapted to maintain a plurality of machine-learning processes, wherein an individual machine-learning process operates based on a data model and decision-making rules. The plurality of machine-learning processes operate based on a plurality of different data models and a plurality of different decision-making rules. The apparatus is adapted to obtain values of Key Performance Indicators, KPIs, from network elements of the communications network and to obtain a goal defining at least one KPI value characterising wanted operation of the communications network. The apparatus is also adapted to produce by the plurality of machine-learning processes, based on the received values of KPIs and using the data models and decision-making rules, a plurality of individual recommendations. An individual recommendation gives value of at least one parameter, which needs to be configured to achieve the goal. The apparatus is also adapted to produce an output recommendation based on the produced individual recommendations.

According to a fourth aspect of the present invention there is provided an apparatus for recommending configuration changes in a communications network. The apparatus comprises a first receiver for receiving a stream of values of Key Performance Indicators, KPIs, obtained from network elements of the communications network and a second receiver for receiving a goal defining at least one KPI value characterising wanted operation of the communications network. The apparatus also comprises a plurality of machine-learning processes for producing a plurality of individual recommendations, wherein an individual recommendation gives value of at least one parameter, which needs to be configured to achieve the goal. An individual machine-learning process operates based on a data model and decision-making rules, and the plurality of machine-learning processes are adapted to operate based on a plurality of different data models and a plurality of different decision-making rules. The apparatus also comprises a module for producing an output recommendation based on the produced individual recommendations According to a fifth aspect of the present invention there is provided a computer program comprising computer program code which, when executed in a network element, causes the network element to execute the methods disclosed in this document. There is further disclosed a carrier containing said computer program, wherein the carrier is one of an electronic signal, optical signal, radio signal, or computer readable storage medium.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

Figure 1:
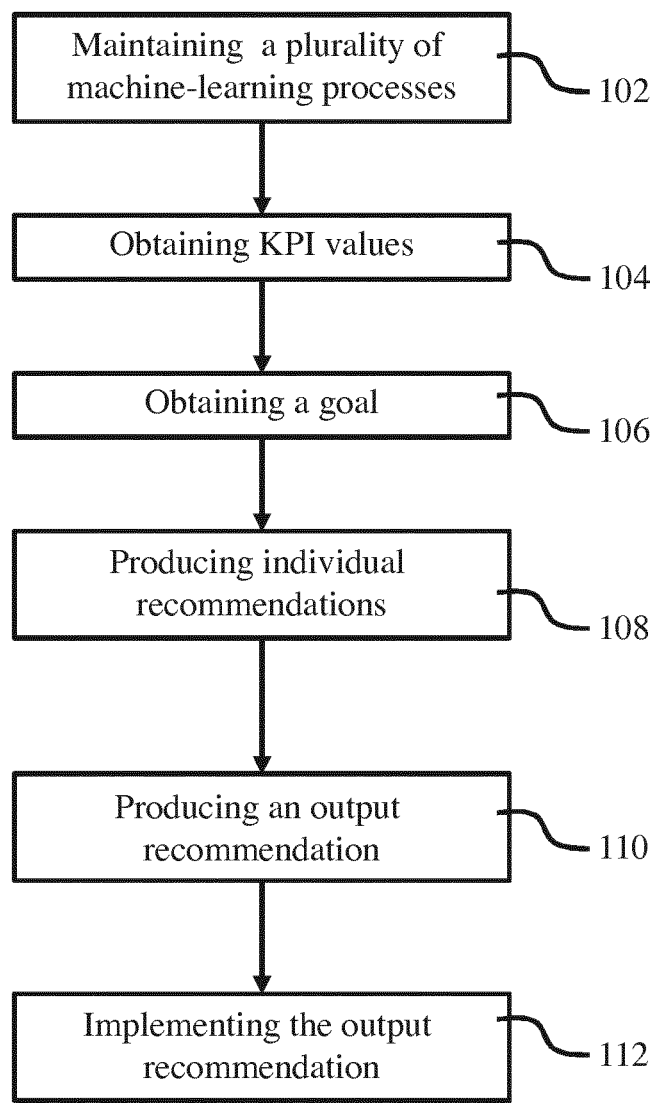
FIG. 1 is a flowchart illustrating an embodiment of a method for recommending configuration changes in a communications network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, programmable logic arrays, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

It is possible to create a machine-learning process and an apparatus that uses a plurality of such machine-learning processes for data mining. These machine-learning processes can be described as an example of an artificial life species; their role is data mining.

As the machine-learning processes receive data, they build a model of it, classify new data based on the model, and choose a response from a set of predetermined actions. The machine-learning processes continuously lose energy (a "metabolism" cost). In order to stay alive, they must earn energy by choosing appropriate responses. The definition of an "appropriate" response depends on the specific data mining task that the machine-learning processes are assigned to. The energy is a parameter characterising individual machine-learning process (i.e. viability of said machine-learning process). When a machine-learning process loses more energy than it earns at some point it ceases to exist, or in an analogy to biological life, it dies.

De Buitléir et al. [1] demonstrated that a population of machine-learning processes, called wains, can indeed discover patterns, make decisions based on those patterns, and adapt to changes in the pattern characteristics of the data. Individual wains learned to make better decisions during their lifetimes, and evolution optimised the operating parameters of their learning and decision-making rules for the data mining task over a few generations.

With reference to FIG. 1 an embodiment of a method for recommending configuration changes in a communications network is now to be described.

In telecommunications Key Performance Indicators (KPI) are metrics indicative of performance of the network. One of these performance indicators may be, for example, network latency. Other examples may include lost packets, jitter, data rate throughput of various elements of the network and many other depending on type of networks and services running on the network. Achieving and maintaining certain level of KPI may define a desired level of performance of the network—one could refer to it as the goal to achieve by managing the network.

The method in the embodiment illustrated in FIG. 1 comprises maintaining, 102, a plurality of machine-learning processes, wherein an individual machine-learning process operates based on a data model and decision-making rules. These machine-learning processes form a population of machine-learning processes. In order to get diverse recommendations and from them select an output recommendation the plurality of machine-learning processes operate based on a plurality of different data models and a plurality of different decision-making rules. The method also comprises obtaining, 104, values of Key Performance Indicators, KPIs, from network elements of the communications network and obtaining a goal, 106, defining at least one KPI value characterising wanted operation of the communications network. The method further comprises producing, 108, by the plurality of machine-learning processes, a plurality of individual recommendations, wherein an individual recommendation gives value of at least one parameter, which needs to be configured to achieve the goal. The individual recommendation may give a new value of the parameter to be configured or a value that is not changed compared to what is currently in operation. The second option indicates that no change is needed. The plurality of machine-learning processes produces their recommendations based on the received values of KPIs and using the data models and decision-making rules. Finally, the method comprises producing an output recommendation, 110, based on the produced individual recommendations.

Preferably each machine-learning process in the maintained population produces its individual recommendation in the operation 108, however, in an alternative embodiment only part of the population of the machine-learning processes produce their individual recommendations. The embodiment in which only part of the population produces individual recommendations may be advantageous in situations when the population of the machine-learning processes is large and producing an individual recommendation would take too long. It may be that only a defined percentage of the population produces individual recommendations. Alternatively, the time for producing individual recommendations may be limited (e.g. 15 minutes from receiving a new set of KPIs) and then the produced individual recommendations are used to produce the output recommendation.

The machine-learning processes are capable of recommending configuration changes in a communications network after being deployed based on their data models and decision-making rules. The initial recommendations, however, may not always achieve the desired goal. The machine-learning processes must first be trained and adjust to the specific environment of the communications network where they are deployed. To train machine-learning processes to perform a task such as recommending configuration changes in a communications network, as explained earlier, we present the values of all KPIs as they become available, to the machine-learning processes. The machine-learning processes then choose an action from a set of actions, where each action produces a recommended value of a parameter to be configured (or multiple values of parameters to be configured). When new values for the KPIs become available, they are used to determine which ones of the machine-learning processes receive the energy reward. By rewarding the machine learning processes that produce recommendations leading to improved KPIs and achieving the goal an analogy with a real life may be drawn—the rewarded machine learning processes become stronger and will produce more offspring that inherit mixture of their parent's traits. On the other hand, the machine learning processes making wrong recommendations are not rewarded, they lose energy and eventually they cease to exist and the overall population of machine learning processes evolves towards a system making ever better recommendations.

After the output recommendation is produced in step 110 said output recommendation may be used in a one of a number of different ways depending on implementation. In an automated system the output recommendation may be automatically implemented and alternatively it may be presented to an operator for approval. Preferably, in one embodiment the business-critical changes may require approval by the network operator, whereas less significant configuration changes are carried out according to the output recommendation automatically. In a further preferred embodiment, a threshold which separates configuration changes implemented automatically from those business-critical changes requiring operator's approval moves as the system matures in such a way that more configuration changes are implemented automatically. In yet another embodiment, a configuration change that would prevent a failure or be a response to a failure is implemented automatically whereas a configuration change that is not time-critical may be presented to an operator for approval.

In a preferred embodiment the output recommendation is produced, 110, by selecting the most common individual recommendation in the produced set. This embodiment works well if the parameter to be configured has a value from a number of discrete values, for example: low, medium, high, very high. For parameters having broad range of values, and in particular for recommendations providing more than one parameter to modify, an alternative embodiment is presented.

Figure 2:
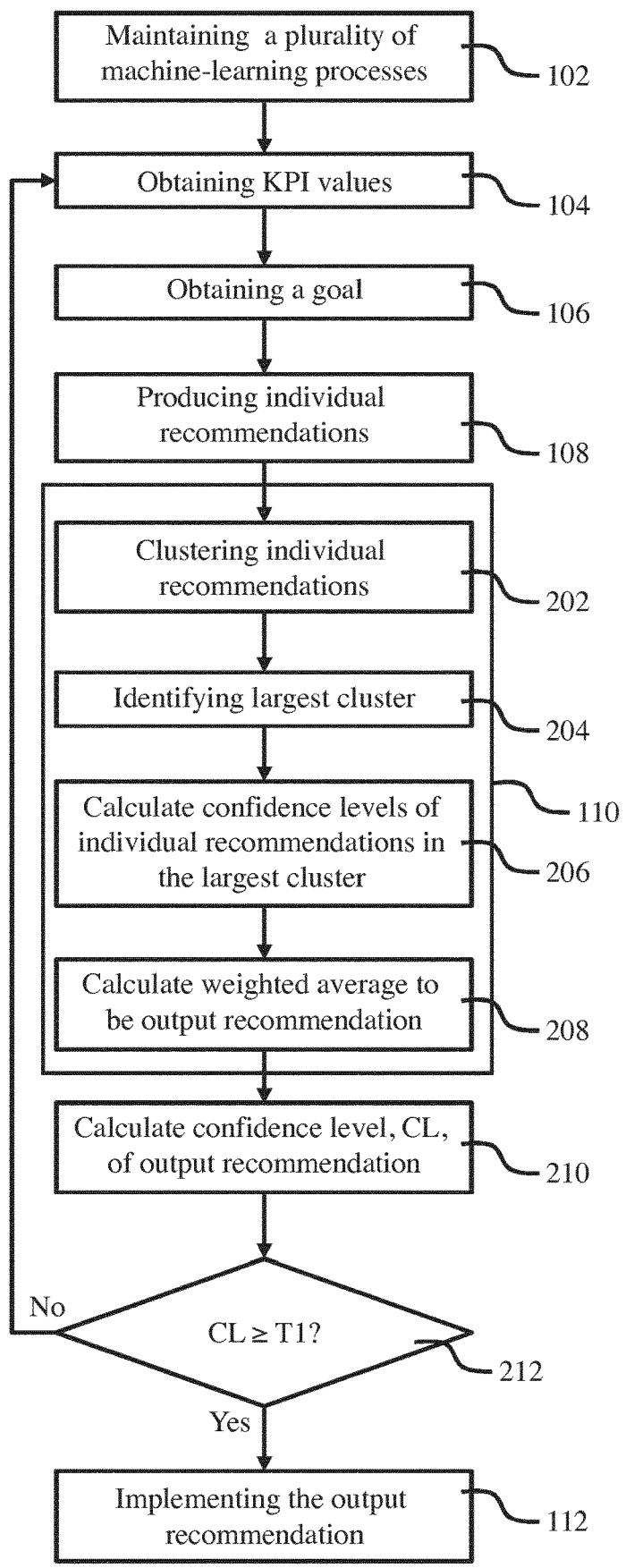
FIG. 2 is a flowchart illustrating an alternative embodiment of a method for recommending configuration changes in a communications network.

In this alternative embodiment, illustrated in FIG. 2, the initial operations, 102-108 are the same as described earlier with reference to FIG. 1. Producing the output recommendation in this embodiment comprises clustering, 202, the individual recommendations and obtaining, from the largest cluster, 204, a median value or an average value or a mode of the at least one parameter to be configured as the output recommendation. Average, median and mode are well known, but to be clear:

the average is the sum of all the members of the set divided by the number of the members in the set;
the median is the value "in the middle", i.e. if X is the median then the number of values lower than X is equal the number of values higher than X;
the mode is the number that is repeated more often than any other in the set (cluster in this embodiment).

When the recommended configuration change is a parameter with a precise value from a broad range then obtaining the output recommendation may be better if we specify an accuracy of overlap of these values that would allow classifying them as the same. With a large population of the individual machine-learning processes we receive many individual recommendations. These individual recommendations may be distributed across their normal operational range and not necessarily be focused around one specific value. In fact, several clusters aggregating the individual recommendations may form.

If the individual recommendations contain not one, but a plurality of parameters to be configured, for example, antenna tilt angle and pilot channel power (PCPICH for UMTS or Reference Signal in LTE), then selecting most common recommendation may be difficult to implement.

Therefore, clustering allows for selecting subsets of recommendations that are close together. Obtaining the output recommendation based on the largest cluster addresses the difficulties associated with parameters having a precise value from a broad range and individual recommendations containing more than one parameter to be configured. This is because members of a cluster are similar. Clustering criteria of define how similar the cluster members are.

The present invention in its embodiments uses know clustering techniques, including classical clustering methods such as K-means and DBSCAN. Other clustering techniques may also be used. Overall quality of the output recommendation would depend on clustering parameters, such as maximum distance to a neighbour in a cluster and a minimum number of values required to form a cluster. After the clusters are obtained the output recommendation is produced based on the largest cluster.

In alternative embodiments statistical functions other than average, median or mode may be used to obtain the output recommendation from the largest cluster. For example, the output recommendation may comprise at least one parameter to be configured, which is calculated as a weighted average of corresponding parameters in said individual recommendations, 208, from the largest cluster. In this embodiment a weight of an individual recommendation may depend at least on a confidence level of said individual recommendation, 206.

The method in one embodiment comprises determining a confidence level of the output recommendation 210. Preferably, the confidence level of output recommendation, 210, is an average of the confidence levels of the individual recommendations from the largest cluster. The statistical function of confidence is used to indicate the quality of the recommendation and in a preferred embodiment the output recommendation is output together with its corresponding confidence level. Further, preferably, if the confidence level of the output recommendation is equal to or exceeds a threshold, 212, the recommendation is implemented (automatically or triggered by the network operator). The advantage of this embodiment is that it prevents triggering configuration changes in situations when their quality is below a certain threshold, where the confidence level is indicative of the quality.

In a preferred embodiment each one of the individual machine-learning processes has a parameter indicative of viability of said individual machine-learning process. Because the communications network is a dynamic structure operating in changing conditions the operations of the method are preferably carried out periodically in order to react to these changing conditions and dynamic nature of the communications network. In each cycle, the obtained KPI values are compared with the goal obtained in the preceding cycle, and if the output recommendation has been implemented, 112, the method comprises, for each individual machine-learning process which produced individual recommendation falling within a defined range around the output recommendation increasing value of the parameter indicative of viability of an individual machine-learning processes if the goal obtained in the preceding cycle has been achieved or reducing the value of the parameter indicative of viability of an individual machine-learning processes by a value corresponding to energy cost required for carrying out the operation of producing an individual recommendation if the goal obtained in the preceding cycle has not been achieved. The above embodiment limits the adjustment of the viability parameter only to the individual machine-learning processes which made "good enough" recommendations and they are to be rewarded or penalised, whereas the remaining ones are left untouched.

In operation, when a new cycle starts the apparatus executing the method receives a set of KPI values from network elements and obtains a goal, step 106, defining at least one KPI value characterising wanted operation of the communications network. The KPIs are actual values, read or otherwise determined by network elements and delivered to the apparatus executing the method in accordance with one embodiment of the present invention. One of these values is the actual value of a first KPI that has been achieved after implementing the output recommendation obtained in the preceding cycle and it is the KPI specified by the goal. In alternative embodiments the goal may specify more than one KPI value. Preferably, in each cycle the method comprises adjusting values of the parameter indicative of viability of these individual machine-learning processes depending on whether the goal obtained at the beginning of the preceding cycle has been achieved or not. If the goal has been achieved the values of the parameter indicative of viability of these individual machine-learning processes are increased. If the goal has not been achieved the values of the parameter indicative of viability of individual machine-learning processes are reduced. In order to ensure fairness, only the individual machine-learning processes that produced individual recommendations used in producing the output recommendation have their parameter indicative of viability adjusted (increased in reward or reduced as a penalty for producing recommendation which, after implementation, didn't result in achieving the goal). Individual machine-learning processes, which didn't contribute to the output recommendation issued and implemented in the preceding cycle have their parameter indicative of viability unchanged. Further, if the output recommendation had not been implemented then the next cycle does not include adjusting the viability parameters. In a preferred embodiment the magnitude of reducing the value of the parameter indicative of viability corresponds to energy cost required for carrying out the operation of producing individual recommendation in current cycle. Alternatively, in order to simplify operation of the method the value used for reducing the parameter indicative of viability is constant. Similarly, the award for achieving the goal may be a constant value that increases the parameters indicative of viability. For the machine-learning process to operate its parameter indicative of viability must be more than zero.

If the method is implemented in such a way that the output recommendation is produced, 110, by selecting the most common individual recommendation in the produced set of individual recommendations then the adjustment of parameters indicative of viability is applied only to those individual machine-learning processes that produced said selected most common individual recommendation. In this embodiment, the condition for falling within a defined range around the output recommendation is met by said most common individual recommendation. When the individual recommendation is a numerical value in some embodiment there may be defined an accuracy, which allows for counting individual recommendations falling within a range defined by said accuracy.

Alternatively, if the method is implemented in such a way that the output recommendation is produced, 110, by clustering and then obtaining the output recommendation based on the largest cluster then the adjustment of parameters indicative of viability is applied only to those individual machine-learning processes which produced individual recommendations belonging to the largest cluster. In this embodiment, the condition for falling within a defined range around the output recommendation is met by individual recommendations belonging to said largest cluster.

Preferably, in the operation of producing an individual recommendation, 108, an individual machine-learning process is allocated a timeslot on a processing circuitry for executing the data model and decision-making rules and for producing the individual recommendation. In this embodiment the individual machine-learning processes take their turns at the processing circuitry one after another.

In an alternative embodiment in the operation of producing an individual recommendation, 108, a plurality of machine-learning processes implement their data models and decision-making rules in parallel on a processing circuitry and produce a plurality of individual recommendations.

It must be noted, that the number of individual recommendations may not be necessarily equal the number of individual machine learning processes that run on the processing circuitry (in both embodiments described above) because some of the individual machine learning processes may not complete in the allocated timeslot.

Figure 3:
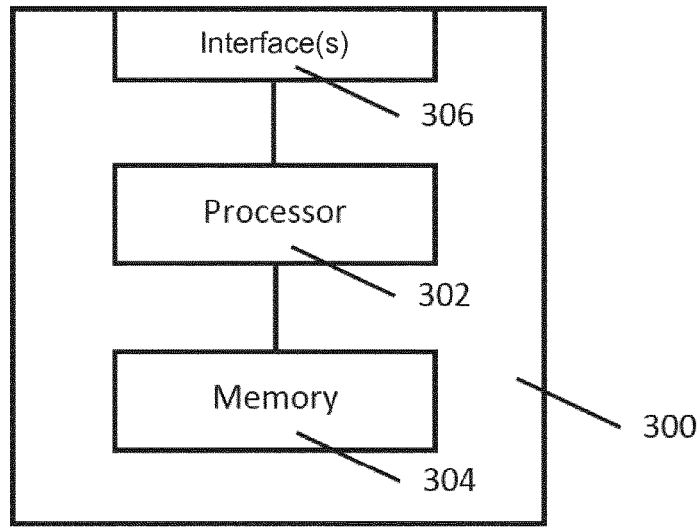
FIG. 3 is a diagram illustrating an embodiment of an apparatus for recommending configuration changes in a communications network.

With reference to FIG. 3 an embodiment of an apparatus, 300, for recommending configuration changes in a communications network is now to be described. The apparatus, 300, comprising a processing circuitry, 302, including one or more processors, and a memory, 304. The memory, 304, contains instructions executable by the processing circuitry, 302, such that the apparatus, 300, is operative to maintain a plurality of machine-learning processes, wherein an individual machine-learning process operates based on a data model and decision-making rules. The plurality of machine-learning processes operates based on a plurality of different data models and a plurality of different decision-making rules. The apparatus, 300, is also operative to obtain values of Key Performance Indicators, KPIs, from network elements of the communications network and obtain a goal defining at least one KPI value characterising wanted operation of the communications network. In one embodiment the KPI values and the goal are received via at least one of interfaces, 306, used for communication with the communications network.

The apparatus, 300, is also operative to produce by the plurality of machine-learning processes, a plurality of individual recommendations, wherein an individual recommendation gives value of at least one parameter, which needs to be configured to achieve the goal. The plurality of individual recommendations is produced based on the received values of KPIs and using the data models and decision-making rules. When the individual recommendations are available (produced) the apparatus, 300, produces an output recommendation based on the plurality of produced individual recommendations.

In its embodiments the apparatus 300 is operative to carry out the embodiments of the method described above with reference to FIGS. 1, 2, 5 and 6.

In one embodiment the apparatus, 300, is operative to produce the output recommendation by selecting the most common individual recommendation in the produced set.

Alternatively, the apparatus, 300, may be operative to cluster the individual recommendations and to obtain, from the largest cluster, a median value or an average value or a mode of the at least one parameter to be configured as the output recommendation. In a preferred embodiment the apparatus, 300, the output recommendation comprises at least one parameter to be configured, and the apparatus, 300, is operative to calculate the output recommendation as a weighted average of corresponding parameters in said individual recommendations, wherein a weight of an individual recommendation depends at least on a confidence level of said individual recommendation.

In one embodiment, the apparatus, 300, is further operative to determine a confidence level of the output recommendation. Preferably, the apparatus, 300, is operative to calculate the confidence level of the output recommendation as an average of the confidence levels of said individual recommendations from the largest cluster.

Preferably, the apparatus, 300, is operative to issue the output recommendation for implementation in the communications network if the confidence level of the output recommendation is equal to or exceeds a first threshold.

In one embodiment each one of the individual machine-learning processes has a parameter indicative of viability of said individual machine-learning process. In this embodiment the apparatus, 300, is operative to periodically carry out the operations leading to producing an output recommendation and, in each cycle, the apparatus is operative to compare the obtained KPI values with the goal obtained in the preceding cycle. If the output recommendation from the preceding cycle has been implemented the apparatus, for each individual machine-learning process which produced individual recommendation falling within a defined range around the output recommendation, is operative to increase value of the parameter indicative of viability of an individual machine-learning process if the goal obtained in the preceding cycle has been achieved or to reduce the value of the parameter indicative of viability of an individual machine-learning processes by a value corresponding to energy cost required for carrying out the operation of producing an individual recommendation if the goal obtained in the preceding cycle has not been achieved.

In one embodiment, if the apparatus, 300, is operative to produce the output recommendation by selecting the most common individual recommendation in the produced set of individual recommendations then the adjustment of parameters indicative of viability is applied only to those individual machine-learning processes that produced said selected most common individual recommendation. In this embodiment, the condition for falling within a defined range around the output recommendation is met by said most common individual recommendation. When the individual recommendation is a numerical value in some embodiment there may be defined an accuracy, which allows for counting individual recommendations falling within a range defined by said accuracy.

Alternatively, if the apparatus, 300, is operative to produce the output recommendation using clustering and to obtain said output recommendation from the largest cluster then the apparatus applies increase or reduction of the value of the parameter indicative of viability of individual machine-learning processes only to the individual machine-learning processes having their recommendations in the largest cluster. In this embodiment, the condition for falling within a defined range around the output recommendation is met by individual recommendations belonging to said largest cluster.

Preferably, in operation, the apparatus, 300, is operative to allocate a timeslot on the processing circuitry to an individual machine-learning process for executing the data model and decision-making rules to produce an individual recommendation. Alternatively, the apparatus, 300, is operative to produce a plurality of individual recommendations by a plurality of machine-learning processes executing their data models and decision-making rules in parallel on the processing circuitry, 302.

It is to be understood that the structures as illustrated in FIG. 3 are merely schematic and that the apparatus, 300, may actually include further components which, for the sake of clarity, have not been illustrated, e.g., further interfaces. The components of the apparatus, 300, may be connected in series or to a bus, or in some other way. Also, it is to be understood that the memory, 304, may include further program code for implementing other functionalities, for example of an Operation Support System, OSS, or a Self-Organising Network. According to some embodiments, also a computer program may be provided for implementing functionalities of the apparatus, 300, e.g., in the form of a physical medium storing the program code and/or other data to be stored in the memory 304 or by making the program code available for download or by streaming.

Figure 7:
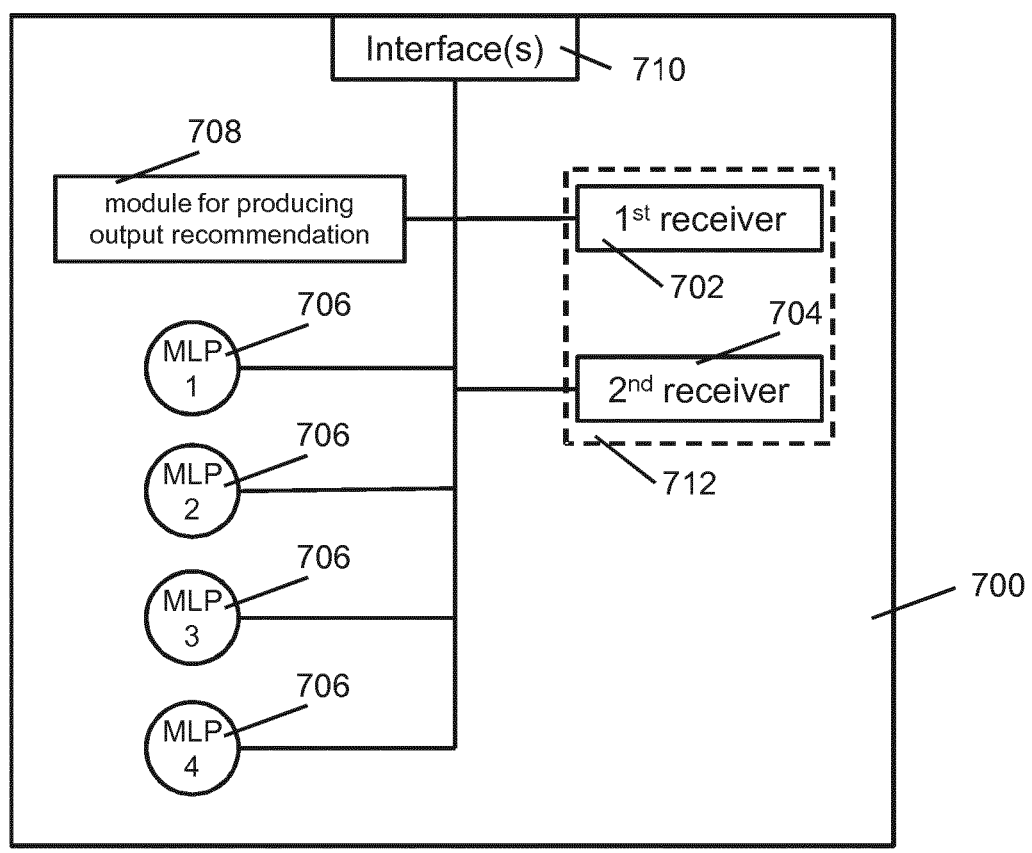
FIG. 7 is a diagram illustrating an alternative embodiment of an apparatus for recommending configuration changes in a communications network.

With reference to FIG. 7 an alternative embodiment of an apparatus, 700, for recommending configuration changes in a communications network will be described. The apparatus, 700, comprises a first receiver, 702, for receiving a stream of values of Key Performance Indicators, KPIs, obtained from network elements of the communications network and a second receiver, 704, for receiving a goal defining at least one KPI value characterising wanted operation of the communications network.

In an alternative embodiment the first receiver, 702 and the second receiver, 704, may be integrated in a single receiver module, 712, for receiving the KPIs and the goal as explained earlier.

The apparatus, 700, also comprises a plurality of machine-learning processes, 706, for producing a plurality of individual recommendations. An individual recommendation gives value of at least one parameter, which needs to be configured to achieve the goal. An individual machine-learning process operates based on a data model and decision-making rules, wherein the plurality of machine-learning processes are adapted to operate based on a plurality of different data models and a plurality of different decision-making rules. The apparatus, 700, further comprises a module for producing an output recommendation, 708, based on the produced individual recommendations.

Using a plurality of different data models and decision-making rules among the population of the machine-learning processes beneficially allows for producing a plurality of different recommendations, which increases likelihood of obtaining recommendations allowing for achieving the goal. In the process of training, rewarding for recommendations allowing for achieving the goal and penalising for producing recommendations not allowing for achieving the goal the population of individual machine-learning evolves towards a system making ever better recommendations.

In one embodiment the KPI values and the goal are received via at least one of interfaces, 710, used for communication with the communications network.

FIG. 7 shows a block diagram for illustrating functionalities of an apparatus, 700, for recommending configuration changes in a communications network. The apparatus, 700, may perform any of the methods that are described above and that are illustrated in any of FIGS. 1, 2, 5 and 6.

It is noted that the apparatus, 700, may include further modules for implementing other functionalities or may be implemented as part of a system, for example an OSS, Operation and Support System or be a part of a Self-Organising Network, SON. The components of the apparatus, 700, may be connected in series or to a bus, or in some other way. Further, it is noted that the modules of the apparatus, 700, do not necessarily represent a hardware structure of the apparatus, 700, but may also correspond to functional elements, e.g., implemented by hardware, software, or a combination thereof.

It is also disclosed a computer program comprising computer program code which, when executed on a processing circuitry of a network element, causes the network element to execute the methods described in this document. There is also disclosed a carrier containing said computer program, wherein the carrier is one of an electronic signal, optical signal, radio signal, or computer readable storage medium.

For better understanding of embodiments of this invention the above and additional details of the solution will now be described by drawing an analogy to a population of live species (artificial life).

Each machine-learning process' traits are encoded in a binary string, similar to the way the traits of a biological organism are encoded in its DNA. When two processes mate, their strings are recombined to produce the offspring's string. As a result, the offspring inherit a mixture of their parents' traits. These traits include the configuration parameters for the machine learning algorithms comprising the brain (learning and decision-making rules), so parents that make good recommendations are likely to have offspring that make good recommendations too. The machine-learning processes that make the best recommendations receive more frequent energy rewards and tend to live longer and produce more offspring. Thus, each generation tends to produce better recommendations than the previous generation. This is in addition to the learning a machine-learning process does during its lifetime. The recommendations of the current population of machine-learning processes may be weighted by one or more factors. The examples of weighting factors include machine-learning process age, confidence level, and historical records (i.e. how good were their earlier recommendations). In one embodiment, the weighted recommendations of the current population of machine-learning processes are averaged to produce a single output recommendation.

There are many advantages of the present invention in its various embodiments. While most machine-learning systems are "black boxes", it is relatively easy to find out why individual machine-learning processes make the decisions they do. Each machine-learning process' data model and decision-making rules can be examined directly. While the accuracy of most quantitative forecasting methods is highly dependent on the (fixed) configuration, evolution allows the configuration of the machine-learning processes to vary between generations, in response to changing pattern characteristics in the data (KPI input data). Each machine-learning process is an independent recommender, with its own configuration, so rather than relying on a single recommender, the solution presented here takes advantage of the "wisdom of crowds". Another advantage of this solution is that the accuracy of the solution is relatively insensitive to the configuration of the initial population of machine-learning processes—evolution will improve the configuration over time. The system can learn and then remember patterns that occur infrequently. Because machine-learning processes as an example of artificial life species reproduce sexually, the offspring are a blended combination of the parents' configuration parameters. By analogy to biological life suppose a gene setting (allele) encodes a value for a configuration parameter makes the learning and decision-making rules less accurate in making recommendations most of the time, but highly accurate for patterns that occur infrequently. Machine-learning processes that inherit one copy of the allele from a parent can be accurate recommenders in general, assuming they inherit a different allele from the other parent. The allele remains in the gene pool, and is available to future generations. Machine-learning processes that inherit two copies will usually make inaccurate recommendations, and thus will be at a survival disadvantage, and likely not live long. However, when the infrequent pattern arises, the machine-learning processes that inherit two copies will have a survival advantage.

Figure 4:
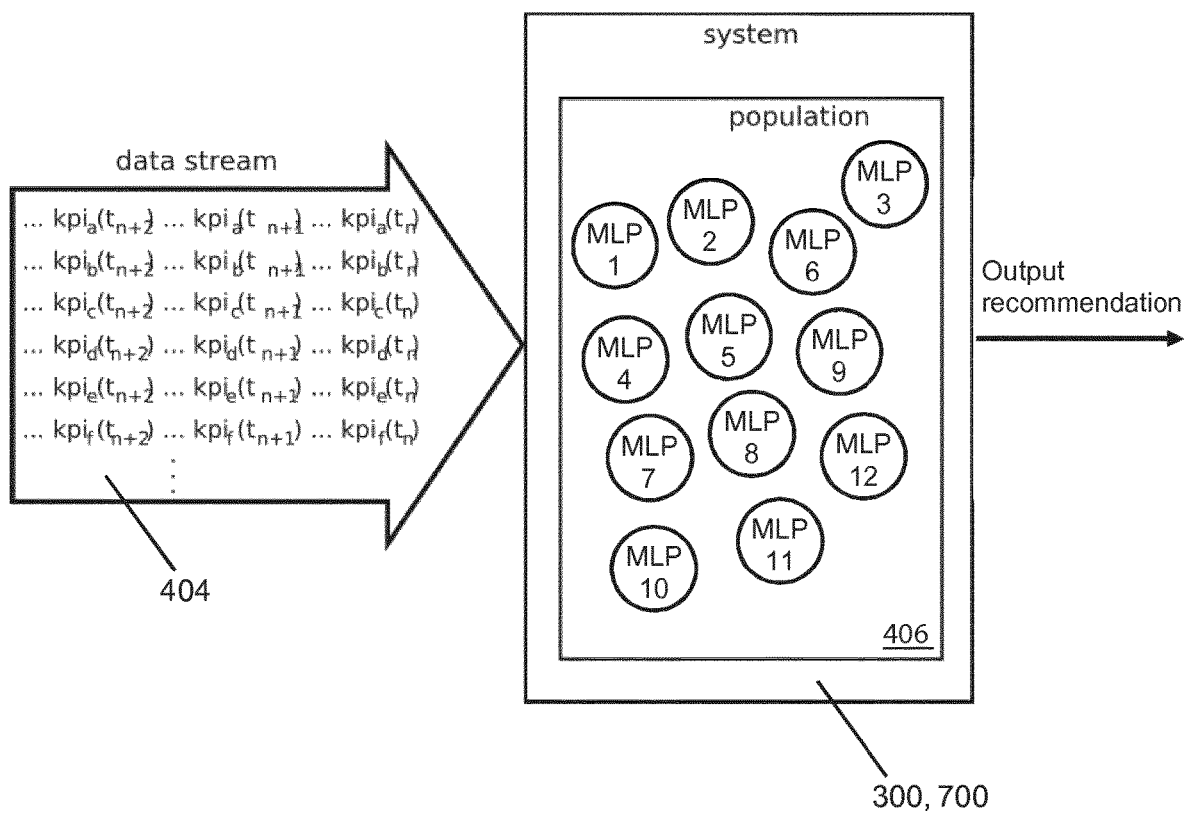
FIG. 4 is a diagram illustrating operation of the apparatus of FIG. 3 in execution of the method illustrated in FIG. 1 or FIG. 2.

FIG. 4 illustrates the overall flow of the method in apparatus 300, 700. The apparatus, 300, 700, receives KPI values, 404, as they are available. Each time a new set of KPI values, 404, 104, arrives, a goal arrives too, 106, and the population, 406, of machine-learning processes generates recommendations giving a value of at least one parameter, which needs to be configured to achieve the goal. The individual recommendations are processed into a single output recommendation. In a preferred embodiment if the system has sufficient confidence that the output recommendation will lead to achieving the goal the recommendation is implemented, either automatically or after confirmation by a network operator, as discussed earlier. The apparatus, 300, 700, as described here recommends change of at least one parameter controlling operation of the communications network from which the KPIs were received based on the current values of a plurality of KPIs. As mentioned earlier, the output recommendation may also be to keep the value of the parameter unchanged.

Figure 5:
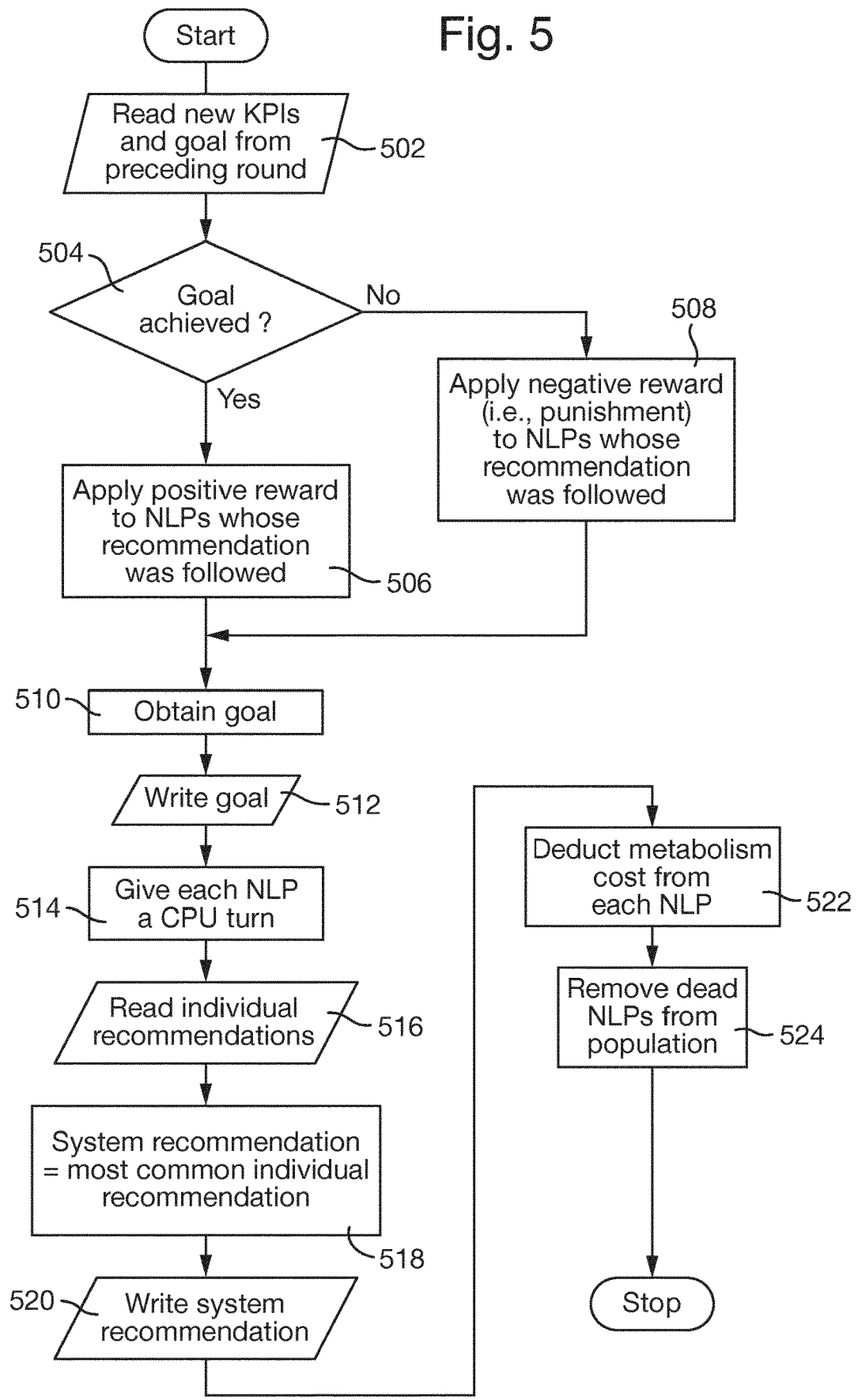
FIG. 5 is one alternative illustration of an embodiment of a method for recommending configuration changes in a communications network.

FIG. 5 illustrates one embodiment of the overall process. A round begins when a new set of KPI values is available. At the start of the round, the new KPI values and the goal from the preceding round are read, 502. If the previously established goal for this round was met, 504, machine-learning processes which recommended the current configuration are given a positive energy reward, 506. If the goal was not met, energy is deducted from machine-learning processes which recommended the current configuration, 508. Machine-learning processes that made a different recommendation are neither rewarded nor punished. Besides from considering whether the goal was met or not the determination of which machine-learning process should be rewarded or penalised depends on particular embodiment and as discussed earlier may be different for embodiments with clustering and without clustering. This part was, however, already explained earlier in the description and will not be repeated here.

The system then obtains the goal for the next round, 510 and writes, 512, it in a memory. Each machine-learning process is given its reward, provided with the new KPI values, and given a turn at the CPU, 514, to make its individual recommendation and potentially mate. Each machine-learning process is given its turn, 514, at the CPU.

Figure 6:
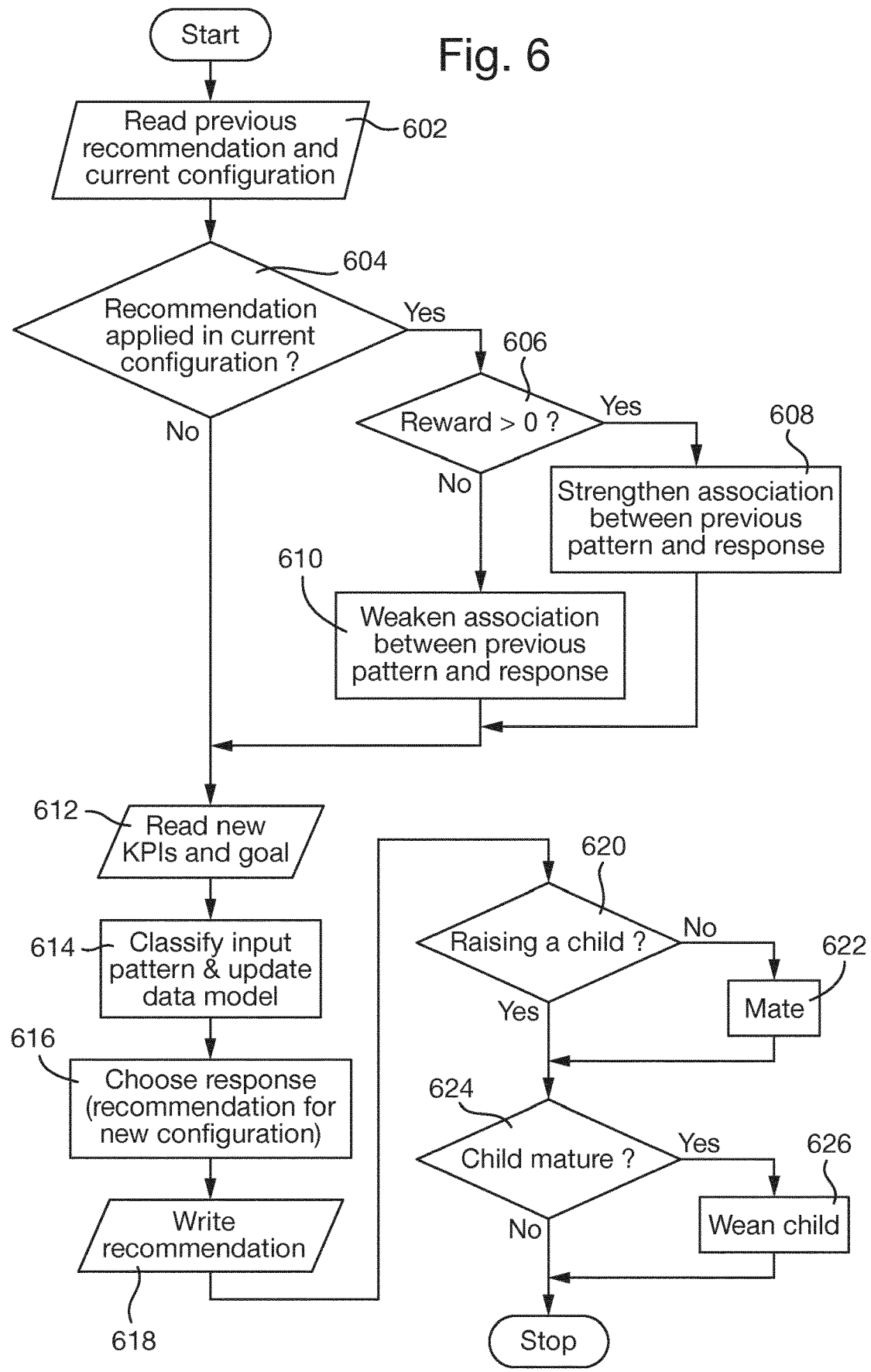
FIG. 6 illustrates actions performed in the embodiment illustrated in FIG. 5 by an individual machine-learning process.

Alternatively, only a portion of the machine-learning processes are given their turn as described earlier. The details of the machine-learning process turn are illustrated in FIG. 6 and discussed below. The system reads individual recommendations in step 516. In this specific embodiment the most common recommendation from the machine-learning processes becomes the output recommendation, 518, which is written into memory, 520 and for use by other systems of the communications network or is output for the network operator to implement. Next, the metabolism cost is deducted, 522, from each machine-learning process viability parameter. This metabolism cost is based on the size of the machine-learning process' brain which discourages them from growing larger brains than necessary and wasting processing resources. Adult machine-learning processes also pay the metabolism cost of any children they are rearing. When a machine-learning process' energy reaches zero, it is considered dead, and is removed from the population, 524.

FIG. 6 shows actions performed by an individual machine-learning process. At the start of its turn, a machine-learning process receives a positive, negative, or zero energy reward, based on the machine-learning process' last recommendation, 602, whether it is applied in current network configuration, 604—yes, and whether or not the goal was met, 606. If the reward is negative (goal wasn't met), 606—no, the machine-learning process' brain will weaken, 610, the association between the pattern it identified in the previous round, and its recommendation. This will make the machine-learning process less likely in future to make the same recommendation in similar scenarios. If the reward is positive (the goal was met), 606—yes, the brain will strengthen, 608, the association, making the machine-learning process more likely to make the same recommendation in similar scenarios. If the reward is zero, the machine-learning process makes no change to the association. Next, the machine-learning process compares the current scenario, i.e., reads, 612, the KPIs for current round plus goal for next round, to its data model, and assigns the ID of the most similar pattern to it, 614. It also updates the data model to incorporate the new scenario, 614. The machine-learning process then examines previous recommendations it has made in response to this scenario, and chooses the recommendation that is most likely to lead to a positive reward, 616. The machine-learning process provides this recommendation to the system, 618. Next, if the machine-learning process is not currently raising a child, 620—no, it may mate, 622. Any resulting offspring will remain with the machine-learning process that initiates the mating. As long as the child remains with the parent, it will see the same KPIs and goals as the parent, observe the recommendations made by the parent, and learn from them. Finally, any children that have reached the age of maturity, 624—yes, are "weaned", 626; that is, they become independent adults, ready to make their own recommendations.

The solution based on embodiments of this invention may be used to recommend configuration changes for a telecoms radio network, for example when energy-saving features can be activated or deactivated, increasing or reducing transmit power, changing antenna tilt, etc.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfill the functions of several units recited in the statements in this document. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

ABBREVIATIONS

ANR—Automatic Neighbour Relations
ASIC—Application Specific Integrated Circuit
DSP—Digital Signal Processor
FPGA—Field Programmable Gate Array
KPI—Key Performance Indicator LTE
NE—Network Element
PCI—Physical Layer Cell Identity
PCPICH—Primary Common Pilot Channel
PLA—Programmable Logic Array
QoS—Quality of Service
SLA—Service Level Agreement
SON—Self-Organizing Network
UMTS—Universal Mobile Telecommunications System

REFERENCES

[1] de Buitléir, Amy, Russell, Michael and Daly, Mark. "Wains: A pattern-seeking artificial life species." Artificial Life 18, no. 4 (2012): 399-423.

The invention claimed is:

1. A method for recommending configuration changes in a communications network, the method comprising:
maintaining a plurality of machine-learning processes, wherein an individual machine-learning process operates based on a data model and decision-making rules, and the plurality of machine-learning processes operate based on a plurality of different data models and a plurality of different decision-making rules;
obtaining values of Key Performance Indicators, KPIs, from network elements of the communications network;
obtaining a goal defining at least one KPI value characterising wanted operation of the communications network;
producing by the plurality of machine-learning processes, based on the received values of KPIs and using the data models and decision-making rules, a plurality of individual recommendations, wherein an individual recommendation gives value of at least one parameter, which needs to be configured to achieve the goal;
producing an output recommendation based on the produced individual recommendations, and
wherein each one of the individual machine-learning processes has a parameter indicative of viability of said individual machine-learning process and wherein the operations of the method are carried out periodically, and in each cycle, the obtained KPI values are compared with the goal obtained in a preceding cycle, and if the output recommendation has been implemented the method comprises, for each individual machine-learning process which produced individual recommendation falling within a defined range around the output recommendation:
increasing a value of the parameter indicative of viability of an individual machine-learning processes if the goal obtained in the preceding cycle has been achieved; or
reducing the value of the parameter indicative of viability of an individual machine-learning processes by a value corresponding to energy cost required for carrying out the operation of producing an individual recommendation if the goal obtained in the preceding cycle has not been achieved.

2. The method according to claim 1, wherein the output recommendation is produced by selecting the most common individual recommendation in the the plurality of individual recommendations.

3. The method according to claim 1, comprising clustering the individual recommendations and obtaining, from the largest cluster, a median value or an average value or a mode of the at least one parameter to be configured as the output recommendation.

4. The method according to claim 3, wherein the output recommendation comprises at least one parameter to be configured, which is calculated as a weighted average of corresponding parameters in said individual recommendations, wherein a weight of an individual recommendation depends at least on a confidence level of said individual recommendation.

5. The method according to claim 3 further comprising determining a confidence level of the output recommendation.

6. The method according to claim 5, wherein the confidence level of the output recommendation is an average of the confidence levels of said individual recommendations from the largest cluster.

7. The method according to claim 5, wherein the output recommendation is implemented if the confidence level of the output recommendation is equal to or exceeds a first threshold.

8. The method according to claim 1, wherein if the output recommendation had been produced using clustering and obtained from the largest cluster then the operations of increasing and reducing the value of the parameter indicative of viability of individual machine-learning processes are applied only to the individual machine-learning processes having their recommendations in the largest cluster.

9. The method according to claim 1, wherein in the operation of producing an individual recommendation an individual machine-learning process is allocated a timeslot on a processing circuitry for executing the data model and decision-making rules and producing an individual recommendation.

10. A computer program comprising computer program code which, when executed in a network element, causes the network element to execute the method according to claim 1.

11. An apparatus for recommending configuration changes in a communications network, the apparatus comprising a processing circuitry and a memory, the memory containing instructions executable by the processing circuitry such that the apparatus is operative to:
maintain a plurality of machine-learning processes, wherein an individual machine-learning process operates based on a data model and decision-making rules, and the plurality of machine-learning processes operate based on a plurality of different data models and a plurality of different decision-making rules;
obtain values of Key Performance Indicators, KPIs, from network elements of the communications network;

obtain a goal defining at least one KPI value characterising wanted operation of the communications network;

produce by the plurality of machine-learning processes, based on the received values of KPIs and using the data models and decision-making rules, a plurality of individual recommendations, wherein an individual recommendation gives value of at least one parameter, which needs to be configured to achieve the goal;

produce an output recommendation based on the produced individual recommendations, and wherein each one of the individual machine-learning processes has a parameter indicative of viability of said individual machine-learning process and wherein the apparatus is operative to periodically carry out the operations leading to producing an output recommendation and, in each cycle, the apparatus is operative to compare the obtained KPI values with the goal obtained in a preceding cycle, and if the output recommendation has been implemented the apparatus is operative to:

for each individual machine-learning process which produced individual recommendation falling within a defined range around the output recommendation:

increase a value of the parameter indicative of viability of an individual machine-learning process if the goal obtained in the preceding cycle has been achieved;

reduce the value of the parameter indicative of viability of an individual machine-learning processes by a value corresponding to energy cost required for carrying out the operation of producing an individual recommendation if the goal obtained in the preceding cycle has not been achieved.

12. The apparatus according to claim 11 operative to produce the output recommendation by selecting the most common individual recommendation in the the plurality of individual recommendations.

13. The apparatus according to claim 11 operative to cluster the individual recommendations and to obtain, from the largest cluster, a median value or an average value or a mode of the at least one parameter to be configured as the output recommendation.

14. The apparatus according to claim 13, wherein the output recommendation comprises at least one parameter to be configured, and the apparatus is operative to calculate the output recommendation as a weighted average of corresponding parameters in said individual recommendations, wherein a weight of an individual recommendation depends at least on a confidence level of said individual recommendation.

15. The apparatus according to claim 13 further operative to determine a confidence level of the output recommendation.

16. The apparatus according to claim 15, operative to calculate the confidence level of the output recommendation as an average of the confidence levels of said individual recommendations from the largest cluster.

17. The apparatus according to claim 15 operative to issue the output recommendation for implementation if the confidence level of the output recommendation is equal to or exceeds a first threshold.

18. The apparatus according to claim 11, wherein if the output recommendation had been produced using clustering and obtained from the largest cluster then the apparatus is operative to apply increase or reduction of the value of the parameter indicative of viability of individual machine-learning processes only to the individual machine-learning processes having their recommendations in the largest cluster.

* * * * *